United States Patent
Chen et al.

(10) Patent No.: US 6,562,257 B1
(45) Date of Patent: May 13, 2003

(54) LOOSE-FILL INSULATION WITH IMPROVED RECOVERABILITY

(75) Inventors: Liang Chen, New Albany, OH (US); William E. Downey, Granville, OH (US)

(73) Assignee: Owens Corning Fiberglas Technology, Inc., Summit, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/557,357

(22) Filed: Apr. 25, 2000

(51) Int. Cl.[7] .............................. C09K 3/00; C09K 3/12; D02G 3/00; B05D 5/00; B32B 17/02; B32B 5/00
(52) U.S. Cl. .............................. 252/183.13; 252/183.11; 428/378; 428/392; 427/213; 427/387; 427/389.8
(58) Field of Search .................................. 428/370, 371, 428/378, 392, 375; 427/212, 213, 387, 389.8; 252/183.11, 183.13

(56) References Cited

U.S. PATENT DOCUMENTS

| | | | |
|---|---|---|---|
| 3,597,265 A | | 8/1971 | Mecklenborg et al. |
| 4,455,330 A | | 6/1984 | Nishioka et al. |
| 4,530,860 A | * | 7/1985 | Johnson ...................... 427/386 |
| 4,555,447 A | | 11/1985 | Sieloff et al. |
| 4,829,738 A | * | 5/1989 | Moss ........................ 52/743 |
| 5,624,742 A | * | 4/1997 | Babbitt et al. .............. 428/212 |
| 5,683,810 A | * | 11/1997 | Babbitt et al. .............. 428/370 |
| 5,786,082 A | * | 7/1998 | Evans et al. ................ 428/369 |
| 5,972,503 A | | 10/1999 | Woodside |
| 6,322,888 B1 | * | 11/2001 | Moireau et al. ............ 428/378 |
| 6,379,794 B1 | * | 4/2002 | Girgis ........................ 428/375 |
| 6,399,198 B1 | * | 6/2002 | Miller et al. ................ 428/392 |

FOREIGN PATENT DOCUMENTS

| | | |
|---|---|---|
| EP | 0 707 105 A1 | 4/1996 |
| JP | 04 077329 | 3/1992 |
| WO | WO 80/00958 | 5/1980 |

* cited by examiner

*Primary Examiner*—Joseph D. Anthony
(74) *Attorney, Agent, or Firm*—Inger H. Eckert; Stephen W. Barns; Maria C. Gasaway

(57) ABSTRACT

The present invention relates to a pourable or blowable loose-fill insulation, and in particular to a loose-fill insulation comprising glass fibers which are compressed and packaged in relatively small containers for easier installation by consumers. Agents capable of chemically interacting with the glass fibers are used in order to increase recoverability of the compressed glass fibers when they are removed from their packaging.

17 Claims, No Drawings

LOOSE-FILL INSULATION WITH IMPROVED RECOVERABILITY

BACKGROUND OF THE INVENTION

The present invention relates to a pourable or blowable loose-fill insulation for sidewall and attic installation, and in particular to a loose-fill insulation comprising glass fibers which are compressed and packaged in relatively small containers for easier installation by consumers.

In recent years, many homeowners have begun to install extra insulation in their attics or crawlspaces in an effort to save money on heating and cooling bills. A common form of insulation used by consumers has been fiberglass insulation batts. However, insulation batts are relatively expensive and may require some cutting and shaping during installation.

More recently, the use of glass fiber blowing wool or loose-fill insulation has increased in popularity. Loose-fill insulation is not formed into a blanket or batt, but rather comprises smaller nodules of straight, short fibers which are packaged into large bags usually weighing about 35 lbs. (16 kg). The insulation is installed by adding the loose-fill to the hopper of a pneumatic blower which blows the loose fill insulation into the desired area. Loose-fill insulation is popular because it can be easily and quickly applied in both new as well as in existing structures. Moreover, loose-fill insulation is a relatively low cost material.

An optimal loose-fill product would comprise a mass of glass fibers compacted into a container for shipping in such a manner so that when the container is opened, the compacted glass fibers are capable of expanding as closely as possible to their original volume before compaction. The ability of a mass of compacted glass fibers to expand towards its original volume is referred to as "recoverability." An increase in recoverability is desirable in order to increase insulative and handling properties. When there is very little recovery, the compacted fibers expand very little and have properties similar to brick. This situation is referred to as "bricking" and is undesirable because it leads to poor insulative and handling properties. Installation of loose-fill insulation generally involves feeding bags containing compressed glass fibers into a hopper where the bags are opened and the contents deposited on to a conveyor which transports the glass fibers to a blower. When bricking occurs the bags become very difficult to open in the hopper and even when the bags are opened the conveyor is often damaged. Causes of bricking are: 1) mechanical interactions such as the rubbing of glass fibers against on another leading to glass fiber fracture and clumping, and 2) chemical interactions of glass fiber towards one another and the environment. Chemical interaction is defined herein as: 1) bonding resulting from an attracting force, such as hydrogen bonding or Van der Waals bonding or 2) chemical bonding, which is typically covalent bonding.

A common solution to promote recoverability and prevent bricking is the addition of sizing compositions containing lubricants to the glass fibers before they are compacted into a container for shipment as loose-fill insulation. Lubricants help minimize the interaction of glass fibers with one another thereby increasing recoverability. However, lubricants primarily function to reduce the mechanical interactions of glass fibers and do very little to reduce the chemical interactions of glass fibers towards one another and/or to the environment. It would therefore be desirable to discover agents which effectively reduce the chemical interactions of glass fibers and thereby increase recoverability.

Furthermore, low recoverability is encountered when shipments of compacted glass fibers are stored in hot and humid conditions. Lubricants do little to prevent the chemical interactions of water with compacted glass fibers under hot and humid conditions. It would therefore be desirable to discover agents which effectively reduce the chemical interactions of glass fibers with water under hot and humid conditions in order to increase recoverability and to reduce bricking. A solution contemplated by this invention is the application of a sizing composition comprising agents capable of chemically interacting with the surface of compacted glass fibers.

Agents, commonly referred to as "coupling agents," are known to chemically interact with glass fibers. An example of the use of coupling agents is found in U.S. Pat. No. 5,972,503. These coupling agents are used to chemically couple glass fibers with a binder or polymer matrix in order to make fiberglass insulation batts or composite materials. Coupling agents have a functional group which chemically interacts with the glass fiber surface and another functional group which chemically interacts with a binder or polymer matrix. Unlike coupling agents, the agents used in this invention are intended to increase the recoverability of compacted glass fibers by chemically interacting with the surface of glass fibers in the absence of any binder or any polymer matrix.

SUMMARY OF THE INVENTION

The present invention solves the problem of low recoverability and prevents bricking of compacted glass fibers by adding a sizing composition comprising locking agents which are capable of chemically interacting with the glass fiber surface thereby reducing the chemical interactions of the glass fibers to one another and to the environment. The blocking agents of the present invention include any agents which chemically interact with the glass fiber surface by: 1) bonding resulting from an attracting force, such as hydrogen bonding or Van der Waals bonding or 2) chemical bonding, which is typically covalent bonding. The blocking agents are preferably applied to glass fibers before they are compacted for shipping.

Suitable blocking agents for the present invention comprise a functionalized organic substrate (i.e., at least one organic functional group bonded to an organic substrate). Exemplary types of functionalized organic substrates include alcohols, amines, esters, reactive siloxanes, silazanes, silanes, lactams, lactones, anhydrides, carbenes, nitrenes, orthoesters, imides, enamines, imines, amides, and imides.

DETAILED DESCRIPTION OF THE INVENTION

Application of Blocking Agents of Glass Fibers

The sizing composition of the present composition which comprises blocking agents and optional lubricants is preferably deposited on the surfaces of fibers as they exit and cascade downwardly from a bushing or spinner during their manufacture. Glass fibers are typically manufactured by supplying molten glass to a fiber forming device such as a bushing or a spinner. Fibers of glass are attenuated from the device and are blown generally downwardly within a forming chamber and are deposited onto a forming conveyor. The glass fibers may then be chopped to a suitable size. Preferably the sizing composition is applied to the glass fibers as they are being formed by means of suitable spray applicators so as to result in a distribution of the sizing composition throughout a glass fiber mass. The sizing composition may be applied to the fibers as a solution or dispersion in an organic or aqueous medium. Preferably the sizing composition is applied to the fibers as an aqueous solution. Evaporation of the liquid medium occurs before the fibers have been collected.

The glass fiber may be further processed by air blowing to a packaging machine were they are compacted into a container, preferably a plastic bag, for shipment as a loose-fill insulation product. Additional additives, such as antistatic agent, mineral oil for dust reduction, and colorant, may be sprayed along the air blowing path.

Lubricants

In addition to blocking agents, the sizing composition of the present invention preferably comprises a lubricant. Preferably the lubricant is present in the sizing composition in the range of from 0.01%–2.5 wt. % based on the total weight of the glass fibers, preferably from 0.05–0.50 wt. %, and more preferably from 0.10–0.25 wt. Any suitable lubricant may be used in the sizing composition. Examples of lubricants include ethyleneglycol, ethyleneglycol stearates, ethyleneglycol oleates, ethoxylated fatty amines, glycerine, emulsified mineral oil, and organo polysiloxane emulsions. Examples of ethylene glycol stearates include polyethylene glycol monostearate, polyethylene glycol monooleate, and butoxyethylstearate. Other examples of lubricants include stearic ethanolamide (Lubsize K12, available from Alpha/Owens Corning); a lubricant disclosed in U.S. Pat. No. 3,597,265, the disclosure of which is incorporated by reference herein (available from Emery Corp. under the trade designation Emerlube 6760); and a blend of 30% white oil, 30% polyethylene glycol monopelargonate with Mw of about 400, 30% polyoxyethylene (3) myristic alcohol, and 10% ethoxylated alkyl amine (Parastat S-2) (Emerlube 7607, available from Emery Corp.)

Examples of other lubricants include oils and waxes selected from the group consisting of water insoluble vegetable oils and waxes; natural oils primarily unsaturated triglycerides such as corn oil, soya and coconut; hydrocarbon waxes, etc. Emulsifiers may be selected based on the desired HLB (hydrophile-lipophile balance) value which measures the hydrophobic or hydrophilic nature of the substance. The lower the HLB number, the more hydrophobic the material. Examples include a combination of vegetable oil and paraffin wax along with polyoxyethylene sorbitan monooleate and octylphenoxy poly(ethyleneoxylol) ethanol.

Particularly preferred lubricants, include silicones such as DC-346 commercially available from Dow Corning of Midland, Mich.; a blend of castor oil and trimethylolpropane tripelargonate such as T5921/E6701 commercially available from Cognis of North Carolina; dibasic esters such as dimethyl adipate, dimethyl glutarate, dimethyl succinate and mixtures thereof; and DEHA (di(2-ethylhexyl) adipate) and its emulsions. A particularly preferred dibasic ester blend is designated as DBE which is a blend of 55–65 wt. % dimethyl glutarate, 10–25 wt. % dimethyl adipate, and 15–25 wt. % dimethyl succinate, and is commercially available from Dupont of Canada.

Blocking Agents

The blocking agents of the present invention are any agents which chemically interact with the glass fiber surface by: 1) bonding resulting from an attracting force, such as hydrogen bonding or Van der Waals bonding or 2) chemical bonding, such as covalent bonding.

There are numerous reactive sites on the surface of glass fibers mostly composed of units represented by the following formula (R—Si—OH) wherein R represents the remaining glass structure. The hydroxyl group (—OH) is thought to undergo several undesired chemical interactions which may lead to low recoverability and high risk of bricking. For example, the hydroxyl groups of one glass fiber can chemically interact with the hydroxyl groups of another glass fiber. If this interaction is multiplied by the number of fibers in a compacted glass fiber mass, low recoverability may result. The hydroxyl groups in a mass of compacted glass fibers also thought to chemically interact with water from atmosphere which may lead to low recoverability.

In one embodiment of the invention, the blocking agents of the present invention operate through their chemical interaction with the hydroxyl groups located at the surface of glass fibers. The blocking agent essentially binds the hydroxyl groups and prevents chemical interactions that would otherwise occur in a mass of compacted glass fibers. Therefore, any agent capable of reacting with and rendering a hydroxyl group relatively unreactive may be used as the blocking agent of this invention. Most preferable blocking agents are those agents capable of undergoing a covalent bonding reaction with hydroxyl groups located at the surface of glass fibers.

Examples of blocking agents capable of undergoing a covalent bonding reaction with hydroxyl groups located at the surface of glass fibers are silanes chosen from the group consisting of silane esters, vinyl silanes, methacrloxy silanes, epoxy silanes, sulfur containing silanes, amino silanes, ureido silanes and isocyanato silanes. Table 1 shows a listing of preferred silane blocking agents

TABLE 1

|  | Silane | Label | Formula |
|---|---|---|---|
| Silane Esters | Octyltriethoxysilane | A-137 | $CH_3(CH_2)_7(Si(OCH_2CH_3)_3$ |
|  | Methyltriethoxysilane | A-162 | $CH_3Si(OCH_2CH_3)_3$ |
|  | Methyltrimethoxysilane | A-163 | $CH_3Si(OCH_3)_3$ |
|  | Proprietary | A-1230 | Proprietary |
|  | tris-[3-(Trimethoxysilyl)propyl] isocyanurate | Y-11597 | — |
| Vinyl Silanes | Proprietary | RC-1 | Proprietary |
|  | Vinyltriethoxysilane | A-151 | $CH_2{=}CHSi(OCH_2CH_3)_3$ |
|  | Vinyltrimethoxysilane | A-171 | $CH_2{=}CHSi(OCH_3)_3$ |
|  | Vinyl-tris-(2-methoxyethoxy) silane | A-172 | $CH_2{=}CHSi(OCH_2CH_2OCH_3)_3$ |
| Methacryl oxy Silanes | gamma-Methacryloxypropyltrimethoxysilane | A-174 | $CH_2{=}C(CH_3)CO_2CH_2CH_2CH_2Si(OCH_3)_3$ |

TABLE 1-continued

| | Silane | Label | Formula |
|---|---|---|---|
| Epoxy Silanes | beta-(3,4-Epoxycyclohexyl)ethyltrimethoxysilane | A-186 | (structure: epoxycyclohexyl-CH$_2$CH$_2$Si(OCH$_3$)$_3$) |
| | gamma-Glycidoxypropyltrimethoxysilane | A-187 | CH$_2$CHCH$_2$OCH$_2$CH$_2$CH$_2$Si(OCH$_3$)$_3$ (with epoxide) |
| Sulfur Silanes | gamma-Mercaptopropyltrimethoxysilane | A-189 | HSCH$_2$CH$_2$CH$_2$Si(OCH$_3$)$_3$ |
| | Proprietary polysulfidesilane | RC-2 | Proprietary |
| Amino Silanes | gamma-Aminopropyltriethoxysilane | A-1100 A-1101 A-1102 | H$_2$NCH$_2$CH$_2$CH$_2$Si(OCH$_2$CH$_3$)$_3$ |
| | Aminoalkyl silicone | A-1106 | (H$_2$NCH$_2$CH$_2$CH$_2$SiO$_{1.5}$)$_n$ |
| | Modified aminoorganosilane | A-1108 | — |
| | gamma-Aminopropyltrimethoxysilane | A-1110 | H$_2$NCH$_2$CH$_2$CH$_2$Si(OCH$_3$)$_3$ |
| | N-beta-(Aminoethyl)-gamma-aminopropyltrimethoxysilane | A-1120 | H$_2$NCH$_2$CH$_2$NHCH$_2$CH$_2$CH$_2$Si(OCH$_3$)$_3$ |
| | Modified aminoorganosilane | A-1126 | — |
| | Modified aminosilane | A-1128 | — |
| | Triaminofunctional silane | A-1130 | H$_2$NCH$_2$CH$_2$NHCH$_2$CH$_2$NHCH$_2$CH$_2$CH$_2$Si(OCH$_3$)$_3$ |
| | Bis-(gamma-trimethoxysilylpropyl)amine | A-1170 | HN(CH$_2$CH$_2$CH$_2$Si(OCH$_3$)$_3$)$_2$ |
| | Organomodified Polydimethylsiloxane | Y-11343 | CH$_3$SiO[(CH$_3$)$_2$SiO]$_x$[CH$_3$SiO]$_y$[CH$_3$SiO]$_z$Si(CH$_3$)$_3$ with NR$_2$ and NHR'Si(OR')$_3$ substituents |
| | Polyazamide silane | A-1387 | — |
| Ureido Silanes | gamma-Ureidopropyltrialkoxysilane | A-1160 | H$_2$NCNHCH$_2$CH$_2$CH$_2$Si(OCH$_3$)$_x$(OCH$_3$CH$_2$)$_{3-x}$ (C=O) |
| | gamma-Ureidopropyltrimethoxysilane | Y-11542 | H$_2$NCNHC$_3$H$_6$Si(OCH$_3$)$_3$ (C=O) |
| Isocyanato Silanes | gamma-Isocyanatopropyltriethoxysilane | A-1310 | O=C=NCH$_2$CH$_2$CH$_2$Si(OCH$_2$CH$_3$)$_3$ |

In addition to the Table 1, another example of a silane useful as a blocking agent is a vinyl amino silane such as Z-6032 and Z-6032, both commercially available from manufactured by Dow Corning of Midland, Mich. Z-6032 is a 40% silane solution in methanol; has a specific gravity of 0.9% at 25° C., a refractive index of 1.395 at 25° C., and a viscosity of 2.2 t 25° C. The chemical formula is (CH$_5$O)$_3$—SiCH$_2$CH$_2$CH$_2$NHCH$_2$CH$_2$NHCH$_2$—O—CH=CH$_2$—HCl and is designated N-2-(vinyl benzylamino)-ethyl-3-amino propyltrimethoxy silane-monohydrogen chloride. Z-6224 has a specific gravity of 0.88 at 25° C., a refractive index of 1.388 at 25° C. and is the neutralized (chloride-free) version of Z-6032.

A further example of blocking agents capable of undergoing a covalent bonding reaction with hydroxyl groups located at surface of glass fibers are reactive siloxanes. Examples of reactive siloxanes include DC-1171, DC-75SF, and DC-2-7887, all commercially available from Dow Corning of Midland, Mich. Reactive siloxanes are thought to be linear or branched structures with the following monomeric units (I):

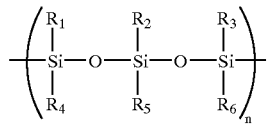

R1, R2, R3, R4, R5, and R6 may differ from one monomeric unit to another and are chosen from alkyl, preferably methyl, and hydride. When branched, R1, R2, R3, R4, R5, and R6 may be one of more monomeric units (I). The reactivity of reactive siloxanes and their ability to act as blocking agents increases with increased number of hydride groups for R1, R2, R3, R4, R5, and R6.

EXAMPLES

As shown in Table 2, various additives were tested for their ability to affect recoverability. A sizing composition was made by mixing lubricants, additives, and water in the weight percents listed in Table 2 based on glass fiber weight. The sizing composition was then deposited by spraying glass fibers as they exit downwardly from a spinner during their production. The fibers were then chopped to desired size, air transferred, collected and compacted into a linear low density polyethylene (LLDPE) bags. The filled bags weighed 30 lbs.±2 lbs. (13.60 kg±0.90 kg) and had the following dimensions 18 in.×9 in.×20 in. (45.72 cm×22.86 cm×50.80 cm) with a ±1.0 in. (±2.5 cm) variation. Each bag and its contents was then subjected to a temperature of 90° F. and a relative humidity of about 90% for a period of 7–10 days. Immediately after this period, the compacted glass fibers contained in each bag were tested for recoverability by the following procedure:

1. Each bag was placed lengthwise on a smooth, clean, table (bag face up or down), with a long edge placed against a vertical edge attached at one end of the table.
2. The average width of each bag was recorded to the nearest full inch to give an initial width.
3. The date and time of production was recorded.
4. The ends of each bag were trimmed off with a knife to remove all edge constraints as the wool expanded.
5. The long edge of each bag was slit at approximately mid-height, about 2 inches in from each edge.
6. The long edge of each bag was rapidly slit from end to end at approximately mid-height.
7. The material was allowed to expand freely from each bag for about 30 seconds.
8. The average final width of the material was recorded to the nearest full inch.
9. The percentage recovery was then recorded wherein percentage recovery is defined as 100×((Final Width−Initial Width)÷Initial Width)

As can be seen by example 2 and comparative example 1, addition of an amino silane (A-1100) increases recovery when added to a sizing composition.

Comparative examples 3 and 4 show that merely increasing the amount of lubricant does not lead to any noticeable change of recovery. Comparative example 5 shows that the use of two lubricants T5921/E6701 and DC-346 does not lead to any noticeable change in recovery.

Examples 6 and 7 show the use of two different reactive siloxanes (DC-1171 and DC-75SF) with the same lubricant (DC-346). Comparative examples 8 and 9 again show that the use of two lubricants (DC-346 and di(2-ethylhexyl) adipate (DEHA)) does not lead to any noticeable change in recovery.

Example 10 shows a reactive siloxane.

Comparative examples 11 and 12 further show that merely increasing the amount of lubricant does not lead to any noticeable change of recovery.

Example 13 and comparative examples 11 and 12 show that DC-75SF increases recovery when added to a sizing composition.

Example 14 and comparative examples 11 and 12 show that A-1100 increases recovery when added to a sizing composition.

Comparative example 15 further shows that lubricant along with (DBE) does not lead to increased recovery.

Example 16 and comparative example 12 show that DC-75SF increases recovery when added to a sizing composition.

Remaining comparative examples 17–20 only use lubricants and show that lubricants alone does little to improve recoverability.

It is believed that the differences in the ability of additives DC-1171, DC-2-887, and DC-755F to affect recoverability is due to their reactivity, i.e. to the number of hydride reactive groups of each additive.

TABLE 2

| Example Number | Sizing Composition | | | | | Weight of Bag | | Percentage Recovery |
|---|---|---|---|---|---|---|---|---|
| | Lubricant | wt. % | Additive | wt % | | lbs. | kg | |
| 1a | Siloxane | 0.15 | — | | 0.00 | 29.44 | 13.35 | 45 |
| 1b | DC-346 | | | | | 30.71 | 13.93 | 35 |
| 1c | | | | | | 31.34 | 14.22 | 50 |
| 2a | Siloxane | 0.10 | Amino Silane | | 0.05 | 30.51 | 13.84 | 100 |
| 2b | DC-346 | | A-1100 | | | 30.85 | 13.99 | 105 |
| 2c | | | | | | 30.90 | 14.02 | 105 |
| 3a | Castor oil blend | 0.10 | — | | 0.00 | 31.12 | 14.12 | 75 |
| 3b | T5921/E6701* | | | | | 30.77 | 13.96 | 80 |
| 3c | | | | | | 30.36 | 13.77 | 70 |
| 4a | Castor oil blend | 0.20 | — | | 0.00 | 31.06 | 14.09 | 55 |
| 4b | T5921/E6701* | | | | | 30.48 | 13.83 | 50 |
| 4c | | | | | | 30.82 | 13.98 | 45 |
| 5a | Castor oil blend | 0.10 | Siloxane | | 0.10 | 31.39 | 14.24 | 55 |
| 5b | T5921/E6701* | | DC-346 | | | 29.91 | 13.57 | 35 |
| 5c | | | | | | 30.27 | 13.73 | 50 |
| 6a | Siloxane | 0.10 | Reactive | | 0.10 | 30.37 | 13.78 | 50 |
| 6b | DC-346 | | Siloxane | | | 39.32 | 17.84 | 50 |
| 6c | | | DC-1171 | | | 29.78 | 13.51 | 40 |
| 7a | Siloxane | 0.10 | Reactive | | 0.10 | 29.51 | 13.39 | 90 |
| 7b | DC-346 | | Siloxane | | | 29.64 | 13.44 | 100 |
| 7c | | | DC-75SF | | | 29.97 | 13.59 | 90 |
| 8a | Siloxane | 0.05 | DEHA | | 0.15 | 30.20 | 13.70 | 50 |
| 8b | DC-346 | | | | | 30.50 | 13.83 | 45 |
| 8c | | | | | | 30.68 | 13.92 | 70 |
| 9a | Siloxane | 0.10 | DEHA | | 0.10 | 29.77 | 13.50 | 75 |
| 9b | DC-346 | | | | | 30.72 | 13.93 | 65 |
| 9c | | | | | | 30.59 | 13.88 | 75 |
| 10a | — | 0.00 | Reactive | | 0.20 | 30.52 | 13.84 | 70 |
| 10b | | | Siloxane | | | 30.58 | 13.87 | 75 |
| 10c | | | DC-2-7887 | | | 31.06 | 14.09 | 80 |
| 11a | DEHA | 0.15 | — | | 0.00 | 32.52 | 14.75 | 55 |
| 11b | | | | | | 31.71 | 14.38 | 45 |
| 11c | | | | | | 31.58 | 14.32 | 50 |

TABLE 2-continued

| Example Number | Sizing Composition Lubricant wt. % | | Additive wt % | | Weight of Bag lbs. | kg | Percentage Recovery |
|---|---|---|---|---|---|---|---|
| 12a | DEHA | 0.30 | — | 0.00 | 30.38 | 13.78 | 70 |
| 12b | | | | | 30.76 | 13.95 | 70 |
| 12c | | | | | 30.15 | 13.68 | 65 |
| 13a | DEHA | 0.15 | Reactive | 0.05 | 30.41 | 13.79 | 85 |
| 13b | | | Siloxane | | 31.35 | 14.22 | 80 |
| 13c | | | DC-75SF | | 30.10 | 13.65 | 80 |
| 14a | DEHA | 0.15 | Amino Silane | 0.05 | 31.41 | 14.25 | 95 |
| 14b | | | A-1100 | | 30.96 | 14.04 | 80 |
| 14c | | | | | 29.71 | 13.48 | 90 |
| 15a | DBE** | 0.30 | — | 0.00 | 30.45 | 13.81 | 30 |
| 15b | | | | | 30.89 | 14.01 | 30 |
| 15c | | | | | 30.74 | 13.94 | 35 |
| 16a | DEHA | 0.10 | Reactive | 0.20 | 30.37 | 13.78 | 100 |
| 16b | | | Siloxane | | 29.22 | 13.25 | 90 |
| 16c | | | DC-75SF | | 30.27 | 13.73 | 95 |
| 17a | DEHA | 0.15 | Mineral | 0.60 | 30.38 | 13.78 | 55 |
| 17b | | | Oil | | 30.83 | 13.98 | 50 |
| 17c | | | | | 31.26 | 14.18 | 55 |
| 18a | DEHA | 0.30 | Mineral | 0.75 | 30.95 | 14.04 | 50 |
| 18b | | | Oil | | 30.16 | 13.68 | 50 |
| 18c | | | | | 39.97 | 18.13 | 45 |
| 19a | Siloxane | 0.15 | — | 0.00 | 30.34 | 13.76 | 35 |
| 19b | DC-346 | | | | 31.04 | 14.08 | 45 |
| 19c | | | | | 30.56 | 13.86 | 55 |
| 20a | Siloxane | 0.15 | — | 0.00 | 30.46 | 13.82 | 45 |
| 20b | DC-346 | | | | 29.60 | 13.43 | 45 |
| 20c | | | | | 29.43 | 13.35 | 35 |

*A blend of 40 wt. % T5921 and 60 wt. % E6701
**A blend of 55–65 wt. % dimethyl glutarate, 10–25 wt. % dimethyl adipate, and 15–25 wt. % dimethyl succinate commercially available from Dupont of Canada.

What is claimed is:

1. A pourable or blowable loose-fill insulation product comprising:
   a) glass fiber insulation wool, said glass fiber insulation wool comprising a plurality of glass fibers each having hydroxyl groups on the surface thereof;
   b) a blocking agent chemically interacting with said hydroxyl groups which promotes recoverability and prevents bricking in said glass fiber insulation wool; and
   c) a lubricant promoting recoverability and preventing bricking in said glass fiber insulation wool by minimizing mechanical interactions between each of said plurality of glass fibers; and wherein said pourable or blowable loose-fill insulation product has a percentage recovery of original volume of greater than 70% when a container containing said pourable or blowable loose-fill insulation product in compacted form is opened.

2. The product of claim 1, wherein said blocking agent is selected from the group consisting of silane esters, methacryloxy silanes, epoxy silanes, sulfur containing silanes, amino silanes, ureido silanes, isocyanato silanes, alcohols, amines, esters, silazanes, lactams, lactones, anhydrides, carbenes, nitrenes, orthoesters, imides, enamines, imines, amides and imides.

3. The product of claim 1, wherein said lubricant is selected from the group consisting of silicones, ethyleneglycol, ethyleneglycol stearates, ethyleneglycol oleates, ethoxylated fatty amines, glycerine, emulsified mineral oil, organo polysiloxane emulsions, a blend of castor oil and trimethylolpropane tripelargonate, dibasic esters, and di(2-ethylhexyl) adipate.

4. The product of claim 1, wherein the blocking agent and lubricant are applied as a sizing composition to the glass fibers wherein the blocking agent is present in the sizing composition in the range of from 0.01 to 0.30 wt % based on the weight of the glass fibers and wherein the lubricant is present in the sizing composition in the range of from 0.01 to 2.5% based on the weight of the glass fibers.

5. A pourable or blowable loose-fill insulation product comprising:
   a) glass fiber insulation wool, said glass fiber insulation wool comprising a plurality of glass fibers each having hydroxyl groups on the surface thereof;
   b) a blocking agent chemically interacting with said hydroxyl groups, wherein said blocking agent is selected from the group consisting of silane esters, methacryloxy silanes, epoxy silanes, sulfur containing silanes, amino silanes, ureido silanes, and isocyanato silanes; and
   c) a lubricant; and wherein said pourable or blowable loose-fill insulation product has a percentage recovery of original volume of greater than 70% when a container containing said pourable or blowable loose-fill insulation product in compacted form is opened.

6. The product of claim 5 wherein the blocking agent and the lubricant are applied as a sizing composition to the glass fibers wherein the blocking agent is present in the sizing composition in the range of from 0.01 to 0.25 wt. % based on the weight of the glass fibers.

7. The product of claim 5 wherein the blocking agent and the lubricant are applied as a sizing composition to the glass fibers wherein the blocking agent is present in the sizing composition in the range of from 0.05 to 0.30 wt. % based on the weight of the glass fibers.

8. The product of claim 5 wherein the blocking agent and the lubricant are applied as a sizing composition to the glass fibers wherein the blocking agent is present in the sizing composition in the range of from 0.10 to 0.15 wt. % based on the weight of the glass fibers.

9. The product of claim 5 wherein the blocking agent and the lubricant are applied as a sizing composition to the glass fibers wherein the lubricant is present in the sizing composition in the range of from 0.01 to 2.5 wt. % based on the weight of the glass fibers.

10. The product of claim 5 wherein the blocking agent and the lubricant are applied as a sizing composition to the glass fibers wherein the lubricant is present in the sizing composition in the range of from 0.05 to 0.50 wt. % based on the weight of the glass fibers.

11. The product of claim 5 wherein the blocking agent and the lubricant are applied as a sizing composition to the glass fibers wherein the lubricant is present in the sizing composition in the range of from 0.10 to 0.25 wt. % based on the weight of the glass fibers.

12. The product of claim 5 wherein the blocking agent is capable of undergoing a covalent bonding reaction with the hydroxyl groups of the glass fibers.

13. The product of claim 5 wherein said lubricant is chosen from the group consisting of silicones, ethyleneglycol, ethyleneglycol stearates, ethyleneglycol oleates, ethoxylated fatty amines, glycerine, emulsified mineral oil, and organo polysiloxane emulsions.

14. The product of claim 5 wherein said lubricant is chosen from the group consisting of silicones, a blend of castor oil and trimethylolpropane tripelargonate, dibasic esters, and di(2-ethylhexyl) adipate.

15. The product of claim 5 further comprising additional additives chosen from the group consisting of antistatic agents, mineral oil, colorant, and flame retardants.

16. The product of claim 5 having a percentage recovery of greater than 80%.

17. The product of claim 5 having a percentage recovery of greater than 90%.

* * * * *